(12) United States Patent
Roth

(10) Patent No.: US 6,701,834 B2
(45) Date of Patent: Mar. 9, 2004

(54) DRIVE ARRANGEMENT FOR POWERING PLUNGER AND AUXILIARY FUNCTIONS OF LARGE RECTANGULAR BALER

(75) Inventor: Darin Ledru Roth, Ottumwa, IA (US)

(73) Assignee: Deere & Company, Moline, IL (US)

( * ) Notice: Subject to any disclaimer, the term of this patent is extended or adjusted under 35 U.S.C. 154(b) by 64 days.

(21) Appl. No.: 10/095,239

(22) Filed: Mar. 11, 2002

(65) Prior Publication Data

US 2003/0167939 A1 Sep. 11, 2003

(51) Int. Cl.$^7$ .............................. F16P 5/00; G05G 3/00; B30B 15/00
(52) U.S. Cl. ........................ 100/342; 100/270; 100/280; 74/572; 56/10.8
(58) Field of Search ............................ 100/342, 48, 50, 100/189, 270, 280; 74/89, 89.25, 572, 15.8; 464/46, 161; 56/10.2 R, 10.8, 11.4

(56) References Cited

U.S. PATENT DOCUMENTS

| | | | |
|---|---|---|---|
| 2,644,283 A | | 7/1953 | Rogers et al. .................. 56/10 |
| 2,948,101 A | * | 8/1960 | Long ............................ 56/341 |
| 4,135,444 A | | 1/1979 | White et al. ................... 100/50 |
| 4,241,654 A | * | 12/1980 | van der Lely .............. 100/189 |
| 4,464,137 A | * | 8/1984 | Jennings ....................... 464/48 |
| 4,776,442 A | * | 10/1988 | Young ........................ 192/55.1 |
| 5,090,307 A | * | 2/1992 | Lippens et al. ............... 100/35 |
| 5,899,054 A | * | 5/1999 | Hawlas et al. ................ 56/341 |
| 6,073,428 A | * | 6/2000 | Diekhans ................. 56/10.2 R |

* cited by examiner

Primary Examiner—Allen Ostrager
Assistant Examiner—Jimmy Nguyen

(57) ABSTRACT

A first embodiment of a drive arrangement for a large rectangular baler includes hydraulic pump and motor sets, and second and third embodiments include only gear and shaft arrangements, for driving the plunger for compressing the crop being baled, and for driving all of the auxiliary functions. In all embodiments, power delivered by a main shaft is divided between an auxiliary function drive shaft and a plunger drive shaft. In the first and second embodiments, a flywheel is located for smoothing the power flow to the plunger drive arrangement, and in the third embodiment the flywheel is located for smoothing power flow to both the plunger drive arrangement and the auxiliary function drive arrangement. In all embodiments, the rotation of the shaft carrying the flywheel due to the inertia of the flywheel is ineffective for driving the plunger and auxiliary function drive arrangements when power to the main drive shaft is cut off.

18 Claims, 2 Drawing Sheets

DRIVE ARRANGEMENT FOR POWERING PLUNGER AND AUXILIARY FUNCTIONS OF LARGE RECTANGULAR BALER

FIELD OF THE INVENTION

The present invention concerns large rectangular balers, and, more particularly, concerns power transmission arrangements for driving the plunger and auxiliary functions of a balers for producing parallelepiped bales.

BACKGROUND OF THE INVENTION

It is common practice to design so-called large square or rectangular balers so as to be driven from the PTO of the towing tractor. These drive arrangements often contain a flywheel for smoothing the power flow, however, after the PTO power is cut or stopped, it takes several seconds for the flywheel to stop because of its stored energy. Consequently, pick-up and feed components, as well as the plunger drive, continue to work. If the reason for stopping was because of a foreign object being fed into the baler, then the continued working of the baler components could result in damage to the baler. Also, if the operator stopped so as to inspect some malfunction of the baler, then the coasting parts could possibly endanger the operator if he came quickly to the baler once the PTO was turned off. An example of such a baler drive arrangement is disclosed in U.S. Pat. No. 4,135,444, issued Jan. 23, 1979.

One known large rectangular baler uses the tractor PTO to drive a shaft carrying a flywheel, this shaft in turn being coupled to a pump which supplies the fluid for driving both the plunger and various auxiliary functions of the baler. Thus, the respective hydraulic motors and/or cylinders used to drive the plunger and auxiliary functions continue to receive working fluid for a period of time after power to the PTO is cut off. Again, the time for these components to coast to a stop may be sufficient to permit damage to the baler or for an operator to get entangled in moving parts.

U.S. Pat. No. 2,644,283, issued Jul. 7, 1953, discloses a baler for making rectangular bales, with the plunger and wire tying shuttle being powered by hydraulic cylinders that are supplied by the same pump. Apparently, no flywheel is used in this design.

SUMMARY OF THE INVENTION

According to the present invention there is provided a novel drive arrangement, including a flywheel, for driving the plunger and auxiliary functions of a large rectangular or square baler.

An object of the invention is to provide a large rectangular baler with a drive arrangement including a main power shaft for powering the plunger and all of the remaining auxiliary functions, and including a flywheel which operates to even out the power flow at least to the plunger but is embodied so as not to cause the continued driving of the plunger once power is disconnected from the main power shaft.

A more specific object of the invention is to provide a drive arrangement as defined in the previous object wherein the flywheel is associated only with the plunger drive, the baler drive arrangement including components that operate such that when power to the main power shaft is cut off, the plunger and auxiliary functions stop immediately, with only the flywheel of the plunger drive remaining in motion.

A more specific object of the invention is to provide a baler drive arrangement, according to a first embodiment, including a plunger and auxiliary functions that are hydraulically driven, with power from the main power shaft being split, with one path going through a flywheel clutch to a flywheel and then to a plunger drive pump, and with another path going to drive one or more pumps for supplying pressure fluid to hydraulic auxiliary function drive components.

Another specific object of the invention is to provide a baler drive arrangement, according to a second embodiment, wherein power flow from a main power shaft goes through a power splitting transmission so as to be divided between a plunger drive shaft, which carries a flywheel, and an auxiliary function drive shaft, with a normally-engaged, plunger drive control clutch being coupled between the flywheel and a plunger drive arrangement and wherein, either an one-way clutch is provided between the power splitting transmission and the flywheel, or a normally-engaged, auxiliary function drive control clutch is provided between the power splitting transmission and the auxiliary function drive arrangement. In both cases, the normally-engaged clutches are controlled so as to become automatically disengaged in response to power being cut off to the main power shaft.

Still another specific object of the invention is to provide a baler drive arrangement according to a third embodiment wherein the flywheel is mounted to a main power shaft that is coupled to a power splitting transmission for splitting power between a plunger drive shaft and an auxiliary function drive shaft, and wherein a normally-engaged coupling device is located between the flywheel and the power splitting transmission and operable for automatically disconnecting power to the power splitting transmission, and, hence, to the plunger and auxiliary function drive shafts in response to power to the main power shaft being shut off.

These and other objects of the invention will become apparent from a reading of the ensuing description together with the appended drawings.

DESCRIPTION OF THE PREFERRED EMBODIMENT

Figure 1:
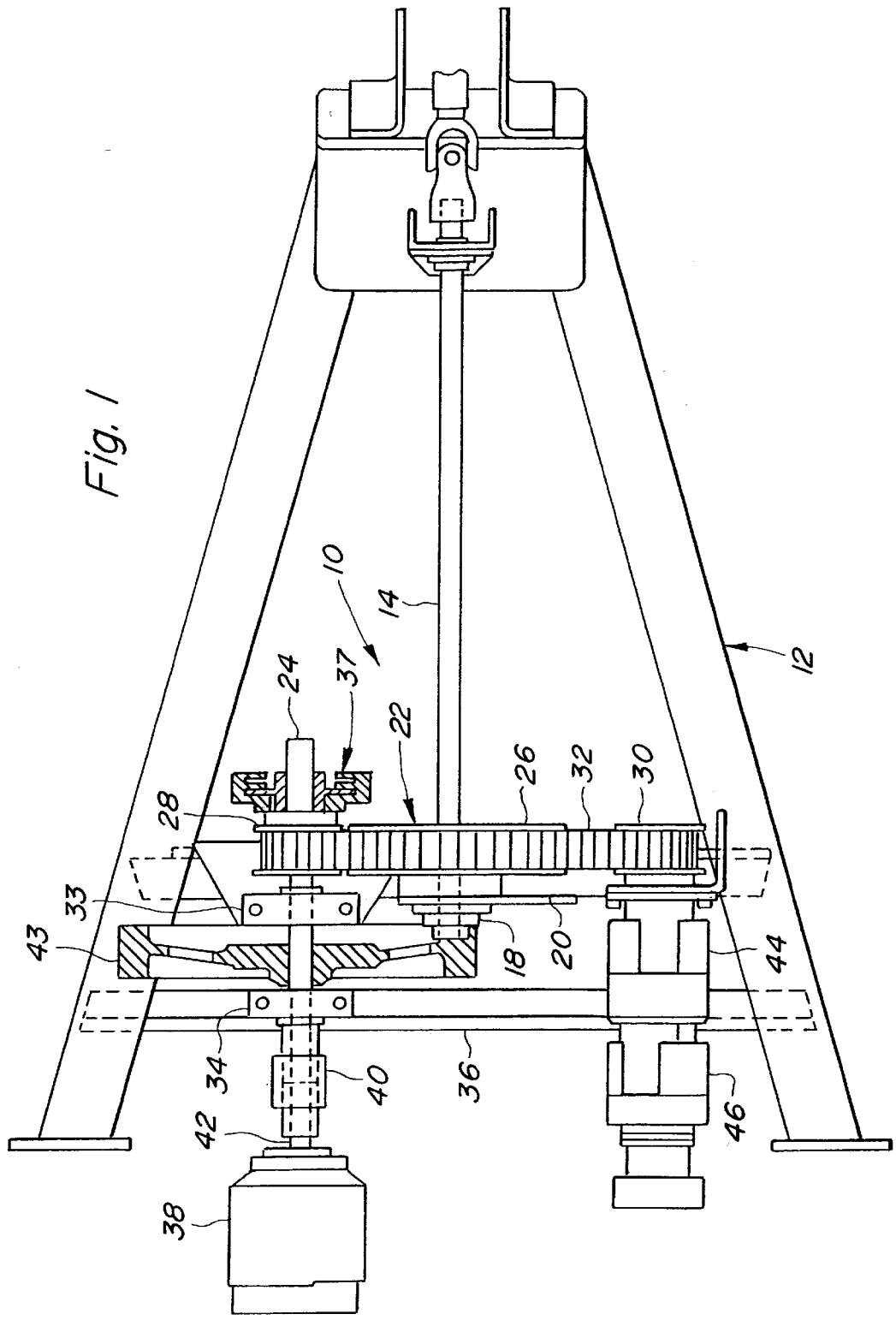
FIG. 1 is a somewhat schematic, top plan view of the drive arrangement for powering pumps for supplying pressure fluid to hydraulic motors for driving the plunger and auxiliary functions of the baler, with some parts being shown in horizontal cross section.

Referring now to the drawing, there is shown a drive arrangement 10 for producing a source of pressurized fluid for operating the hydraulic actuator for driving the plunger and various hydraulically powered devices for driving the various auxiliary functions of a large rectangular or square baler. The drive arrangement 10 is mounted on a tongue 12 adapted for connection to a main frame of the baler. The drive arrangement 10 includes a fore-and-aft extending, main drive or power shaft 14 located centrally between opposite sides of the tongue 12 and having a push-on coupling at its forward end adapted for attachment to a tractor power take-off (PTO) shaft (not shown) to which power from the tractor transmission may be connected and disconnected by operation of an electrically controlled PTO clutch 15, shown schematically in FIG. 4. A rear end of the main drive or power shaft 14 is rotatably supported in a bearing 18 that is fixed to a first cross member 20 extending between opposite sides of the tongue 12.

A power splitting transmission 22 is coupled to the main drive shaft 14 for dividing power between a first output shaft 24 for powering a plunger drive arrangement and a second output shaft (not visible) for powering an auxiliary function drive arrangement. The power splitting transmission 22 includes a drive pulley 26 that is fixed for rotation with the main drive shaft 14, a first driven pulley 28, that is mounted for rotating freely about the first shaft 24, and a second driven pulley 30, that is fixed on the hidden second shaft. A drive belt 32 encompasses the pulleys 26, 28 and 30.

As considered from the view point of a person standing behind the tongue 12 and facing forward, the first output shaft 24 is located to the left of, and disposed parallel to, the main drive shaft 14, the output shaft 24 having a rear section rotatably supported in spaced apart, front and rear bearings 33 and 34 that are respectively fixed to the cross member 20 and to a second cross member 36 spaced behind and extending parallel to the cross member 20. The hidden second output shaft is located to the left of, and is also disposed parallel to the main drive shaft 14.

Power is transferred from the first driven pulley 28 to the first output shaft 24 by a combined friction and one-way clutch 37 carried on a forward section of the shaft 24. It is noted that when the PTO is first engaged, slippage may initially occur between a set of clutch friction elements that are secured to the pulley 28 and a set of the friction elements that are fixed to the shaft 24 until the shaft comes up to the speed determined by that of the main drive or power shaft 14. The drive shaft 24 is connected to a variable displacement, hydraulic plunger drive pump 38 by a coupling 40 received on a rear end of the shaft 24 and on a forward end of an input shaft 42 of the pump 38. The pump 38 is adapted for providing pressurized fluid for operating a two-way plunger drive cylinder. The delivery of power for driving the pump 38 is evened out by a flywheel 43 fixed to the first output shaft 24 at a location between the bearings 33 and 34.

Mounted in tandem at the right side of the tongue 12 are front and rear, variable displacement, hydraulic auxiliary function pumps 44 and 46, respectively. The front pump 44 is fixed to the cross member 20 and includes an input shaft which is the hidden second output shaft on which the second driven pulley 30 is mounted. The auxiliary function drive pumps 44 and 46 are adapted for supplying pressurized fluid for operating a plurality of hydraulic actuators that are respectively used for driving or controlling operation of the various auxiliary functions of the baler 10

Assuming that the drive arrangement 10, disclosed in FIG. 1, is in operation, with the PTO of the towing tractor being turned on, the main drive shaft 14 will be driven from the tractor power take-off shaft. Thus, with the main drive shaft 14 rotating, the drive belt 32 will transfer power to the shaft 24, by way of the combined friction and one-way clutch 37, and, hence to the plunger drive pump 38, and also to the auxiliary function drive pumps 44 and 46. Assuming then that a condition arises requiring the baler drive system to be shut down, the operator will turn off the tractor PTO. This will immediately result in the main drive shaft 14 coming to a halt so that power is no longer delivered to the drive shaft 24 via the clutch 37. The inertia of the flywheel 43 will cause continued rotation of the shaft 24 until the flywheel 43 coasts to a stop. Although the plunger pump 38 will be driven, other controlling arrangements, not otherwise pertinent to this disclosure, will operate to return the displacement of the pump 38 to zero, if it is not already there, so that no pressurized fluid is available for operating the plunger.

However, because the main drive shaft 14 is no longer being driven and the one-way clutch 37 operates such that the rotation of the shaft 24, caused by the inertia of the flywheel 43, is not transferred back to the main drive shaft 14, the auxiliary function drive pumps 44 and 46 will no longer supply pressurized fluid to the auxiliary function hydraulic drive actuators and these components will immediately stop.

If the operator does leave the tractor and approach the baler prior to the flywheel coming to a stop, a manually operable brake (not shown) is provided for arresting the rotation of the flywheel 43.

Thus, it will be appreciated that the drive arrangement 10 operates in a manner which results in the driven components, that are associated with the processing of the crop material being baled, coming to a stop once the operator turns off the PTO of the towing tractor so as to prevent these components from being damaged by foreign objects contained in the crop material or from working against a mass of crop material that is plugging operation of the baler. Also, it is clear that because all of the baler functions, save the flywheel 43, quickly come to rest once the PTO is turned off, the danger of the operator becoming entangled in moving parts is practically eliminated.

While a drive belt arrangement has been provided as a power splitting transmission for transferring power from the main drive or power shaft 14 and the first output shaft 24, and the drive shaft for the auxiliary function drive pumps 44 and 46, it is to be understood that a gear transmission could perform this function as well.

Figure 2:
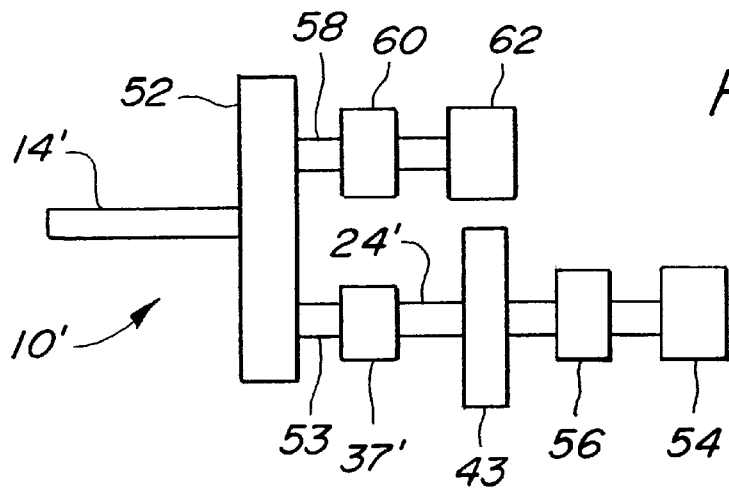
FIG. 2 is a schematic representation of a second embodiment of the invention wherein power is distributed from the main power shaft to the plunger and auxiliary functions drive arrangements by other than fluid pressure generating components.

Referring now to FIG. 2, there is schematically shown an alternative drive arrangement 10' that does not preserve the simplicity and flexibility of the more preferred drive arrangement 10, shown in FIG. 1, but does have the desirable feature of the flywheel 43 becoming isolated from the crop processing components of the baler once power to the main drive shaft is cut off. Specifically, the drive arrangement 10' includes a main power or drive shaft 14' that is coupled to the tractor PTO and to a power-splitting transmission 52. A first output shaft 53 of the transmission 52 is coupled, via a combined friction and one-way clutch 37' to a first output shaft 24' that is coupled to a plunger drive arrangement 54 by way of a normally-engaged plunger drive control clutch 56. Fixed on the shaft 24' at a location between the clutch 37' and the plunger drive control clutch 56 is the flywheel 43. A second output shaft 58 of the transmission 52 is coupled, by a normally-engaged, auxiliary function control clutch 60 to an auxiliary function drive arrangement 62.

The control clutches 56 and 60 are of any type that may be remotely operated to interrupt power flow in response to cutting off power to the main drive 14'. For example, the clutches 56 and 60 may be electrically controlled clutches which include clutch plates that are spring-released upon turning off the electrical current to them when the PTO is turned off, or in the case when the main drive shaft 14' is driven by other than the PTO, it is released in response to cutting off the other power source. It is here noted, that the clutch 60 is necessary only if the one-way clutch 37' is omitted, as it may be if there is no harm in the shaft 14' coasting once power is disconnected from it.

Figure 3:
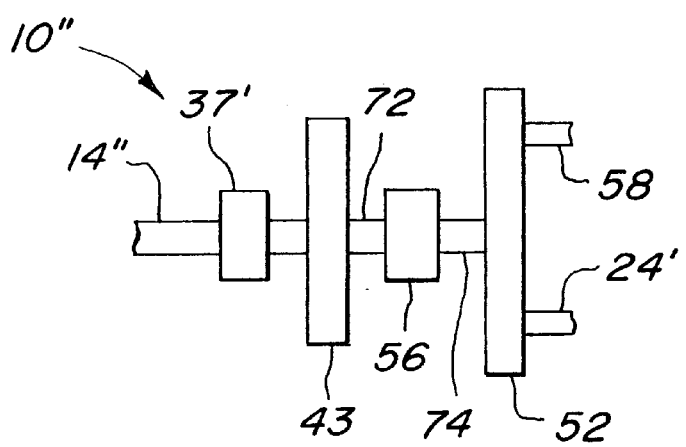
FIG. 3 is a schematic representation of a third embodiment of the invention somewhat like the embodiment illustrated in FIG. 2, but wherein the flywheel is located upstream from the power splitting transmission.

Referring now to FIG. 3, there is provided another embodiment of the invention for achieving the broad object of automatically disassociating the flywheel 43 from the plunger and auxiliary function drive arrangements when power to the main power shaft is cut off. Specifically, a baler drive arrangement 10" includes a main power shaft 14" that is coupled to a first intermediate shaft 72 by the combined friction and one-way clutch 37'. The flywheel 43 is mounted on the shaft 72. The shaft 72 is coupled to a second intermediate shaft 74 by the normally-engaged clutch 56, the intermediate shaft 74 providing the input to the power splitting transmission 52 that delivers power to the first output shaft 24' and the second output shaft 58.

Figure 4:
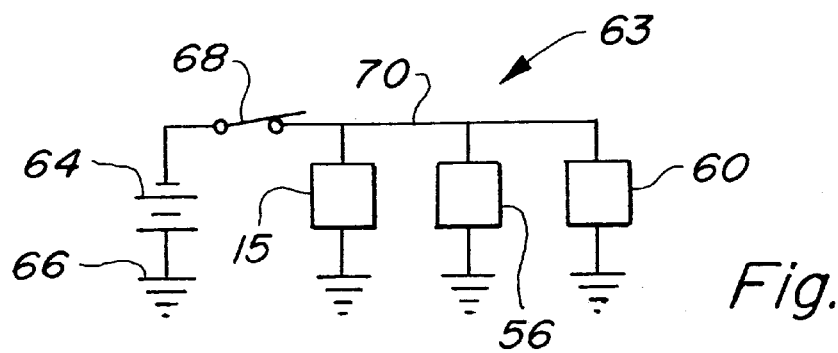
FIG. 4 is a schematic electrical diagram showing the control for automatically effecting disengagement of the normally-engaged clutches associated with the embodiments illustrated in FIGS. 2 and 3.

Referring now to FIG. 4, there is shown an electrical circuit 63 for use with the embodiments shown in FIGS. 2 and 3 for automatically disengaging the normally-engaged clutches 56 and/or 60 in response to disengagement of the PTO clutch 15. Specifically, the electrical circuit 63 includes a source of power in the form of a battery 64, for example, of the towing tractor, coupled between ground 66 and a switch element side of a PTO control switch 68, the latter having its "on" contact coupled to a lead 70 having parallel connections with the PTO clutch 15, and each of the normally-engaged clutches 56 and 60. Thus it will be appreciated that when the switch 68 is closed, as shown, current will be supplied for actuating the clutches 15, 56 and 60 such that they will become engaged. Of course, upon opening the PTO control switch 68 all of the clutches will become disengaged.

Assuming operation of the FIG. 2 embodiment, but with the one-way clutch 37' in place and omitting the auxiliary function control clutch 60, turning off power to the main power shaft 14', by operation of the PTO control switch 68, will result in the plunger control clutch 56 becoming automatically disengaged so as to prevent further driving of the plunger drive arrangement 54. The inertia of the flywheel 43 will cause it to continue to drive the shaft 24', but the one-way clutch 37' prevents the rotation of the shaft 24' from being transferred back into the power-splitting transmission 52. Since no power is coming into the transmission 52, no power is delivered to the auxiliary function drive arrangement 62.

If the one-way clutch 37' is omitted, and the auxiliary function control clutch 60 is used, the inertia of the flywheel 43 will cause the transmission 52 and shaft 14' to free-wheel, but, because the clutch 60 is automatically disengaged in response to shutting off the power to the main drive shaft 14' by opening the PTO control switch 68, no power will be delivered to the auxiliary function drive arrangement 62.

Now turning to the operation of drive arrangement 10" of the embodiment of FIG. 3, and noting that clutch 60 is not used, it will be appreciated that the main power shaft 14" will receive power from the tractor PTO, or another source of power, so long as the clutch 15 is in its "on" condition established by having the switch 68 closed. Power will flow from the shaft 14" to the intermediate shaft 72, and, thus, to the flywheel 43, by way of the one-way clutch 37'. Power is then transferred from the shaft 72 to the shaft 74, by the normally-engaged clutch 56, and then to the power splitting transmission 52 which divides the power between the first and second output shafts 24' and 58. Then, if the control switch 68 is opened, the clutch 15 will become disengaged so as to discontinue the input of power to the shaft 14", and the normally-engaged clutch 56 will become disengaged so as to discontinue the input of power to the shaft 74, and, hence, to the first output shaft 24' and the second output shaft 58. Although the shaft 72 will continue to rotate due to the inertia of the flywheel 43, this rotation is prevented from being fed back to the PTO by the one-way clutch 37 and from being fed forward to the power splitting transmission 52 by the automatically disengaged clutch 56. Accordingly, once the input of power to the main drive shaft 14" is discontinued by opening the switch 68, power is no longer available to drive the plunger and auxiliary functions even though the flywheel 43 may continue rotating for a short while.

Having described the preferred embodiments, it will become apparent that various modifications can be made without departing from the scope of the invention as defined in the accompanying claims.

What is claimed is:

1. In a drive arrangement, for a baler for producing parallelepiped bales, including a controllable power source drive coupling component, a main power shaft, a plunger drive arrangement, an auxiliary function drive arrangement, said power source drive coupling being controllable between on and off conditions for respectively connecting and disconnecting a driving relationship between a power source and said main power shaft, a control arrangement coupled to said power source drive coupling component and being operable for selectively effecting said on and off conditions, said main power shaft being coupled for driving said plunger drive arrangement and said auxiliary function drive arrangement, and a flywheel located between said main power shaft and at least one of said plunger drive arrangement and auxiliary function drive arrangement, the improvement comprising: one of a one-way drive coupling, or a controllable drive component, being coupled between said flywheel and said at least one of said plunger drive arrangement and auxiliary function drive arrangement, and where in the case of the one-way drive coupling, the one-way drive characteristic is operable for preventing rotation of said flywheel from being transferred to said at least one of said plunger drive arrangement and auxiliary drive arrangement, when said power source drive coupling is controlled to said off condition from said on condition, and in the case of said controllable drive component, the latter is connected to said control arrangement and being responsive to said control arrangement being operated to place said power source drive coupling in said off condition for disconnecting said flywheel from said at least one of said plunger drive arrangement and auxiliary function drive arrangement.

2. The drive arrangement, as defined in claim 1, wherein said plunger drive arrangement is powered by hydraulic fluid pressure and includes a hydraulic, plunger drive supply pump for supplying said hydraulic fluid pressure; and said plunger drive supply pump being located on an opposite said of said flywheel from said one of said one-way drive coupling or said controllable drive component.

3. The drive arrangement, as defined in claim 1, wherein said plunger drive arrangement and said auxiliary function drive arrangement are both powered by hydraulic fluid pressure; and respectively include a hydraulic, plunger drive supply pump and an auxiliary function drive pump; and said auxiliary function drive supply pump being located on an opposite side of said one of said one-way drive coupling or said controllable drive coupling from said flywheel.

4. The drive arrangement, as defined in claim 1, wherein said one of said one-way drive coupling or said controllable drive coupling is said controllable drive component; and said controllable drive component being a normally-engaged, electrically controlled clutch; and said control arrangement being coupled to said electrically controlled clutch for automatically shutting off electrical power to said electrically controlled clutch in response to said control arrangement being operated to place said power source drive coupling in its off condition.

5. The drive arrangement, as defined in claim 4, wherein said normally-engaged, electrically controlled clutch is coupled so as to be upstream of both said plunger drive arrangement and said auxiliary function drive arrangement.

6. The drive arrangement, as defined in claim 4 and further including a one-way clutch coupled between said main power shaft and said flywheel for transferring power only in the direction of said flywheel from said main power shaft.

7. The drive arrangement, as defined in claim 1 wherein a power splitting transmission is located for receiving power from said main power shaft and has first and second output shafts respectively coupled for driving said plunger drive arrangement and said auxiliary function drive arrangement; said flywheel being connected to said second output shaft; and said one of said one-way drive coupling or said controllable drive component being located between said flywheel and said plunger drive arrangement.

8. The drive arrangement, as defined in claim 1, and further including a power splitting transmission located for receiving power from said main power shaft and has first and second output shafts respectively coupled for driving said plunger drive arrangement and said auxiliary function drive arrangement; and said one of said one-way drive coupling or said controllable drive component being a one-way clutch coupled between said power splitting transmission and said flywheel.

9. The drive arrangement, as defined in claim 7, and further including a second controllable drive component located between said power splitting transmission and said auxiliary function drive arrangement and being coupled to said control arrangement and responsive to said control arrangement being operated to effect said off condition in said power source drive coupling and thereby disconnecting said auxiliary function drive arrangement from said flywheel.

10. In a drive arrangement of a baler for producing parallelepiped bales and including a main power shaft coupled to a plunger drive arrangement and to an auxiliary function drive arrangement, and further including a flywheel for smoothing the delivery of power during operation, the improvement comprising: a power splitting transmission coupled to said main power shaft; said transmission including first and second output shafts, respectively, for supplying power to said plunger drive arrangement and to said auxiliary function drive arrangement; said flywheel being located at one of a first location upstream of said power splitting transmission, and a second location between said power splitting transmission and said plunger drive arrangement, with a train of drive components thus being defined between said flywheel and said auxiliary function drive arrangement; and said train of drive components including a drive coupling device operable for preventing rotation due to energy stored in said flywheel from being transferred to said auxiliary function drive arrangement upon power being disconnected from the main power shaft.

11. The baler drive arrangement, as defined in claim 10, wherein said flywheel is located on said first output shaft; and said drive coupling device is a one-way clutch forming part of said power splitting transmission for transmitting power only in the direction of said first output shaft from said main power shaft.

12. The baler drive arrangement, as defined in claim 11, wherein said plunger drive arrangement further includes a normally-engaged, plunger drive control clutch connected at an opposite side of said flywheel from said one-way clutch, said plunger drive control clutch being adapted for being automatically disengaged in response to power being disconnected from said main power shaft.

13. The baler drive arrangement, as defined in claim 10, wherein said flywheel is located on said first output shaft; and said drive coupling device is a normally-engaged, auxiliary drive control clutch located between said power splitting transmission and said auxiliary function drive arrangement.

14. The baler drive arrangement, as defined in claim 10, wherein said flywheel is located upstream of said power splitting transmission, and said drive coupling device being a normally-engaged clutch located between said flywheel and said power splitting transmission and adapted for being controlled so as to automatically disconnect power flow to said power splitting transmission in response to power being disconnected from said main power shaft.

15. The baler drive arrangement, as defined in claim 10, wherein said flywheel is mounted to said output shaft; and a plunger drive hydraulic fluid supply pump being connected to said output shaft downstream from said flywheel and adapted for supplying working fluid for powering a hydraulic plunger drive component.

16. The baler drive, as defined in claim 15, wherein said auxiliary function drive arrangement includes at least one hydraulic, auxiliary function drive pump mounted to said second output shaft.

17. A large rectangular baler drive arrangement, comprising: a main drive shaft adapted for being coupled to a source of power; a plunger drive shaft; a hydraulic plunger drive pump coupled to said plunger drive shaft; an auxiliary function drive shaft; a hydraulic auxiliary function drive pump coupled to said auxiliary function drive shaft; a power splitting drive connecting said main drive shaft hydraulic plunger drive pump coupled to said plunger drive shaft; an auxiliary function drive shaft; a hydraulic auxiliary function drive pump coupled to said auxiliary function drive shaft; a power splitting drive connecting said main drive shaft to said plunger drive shaft and to said auxiliary function drive shaft; a flywheel mounted on said plunger drive shaft between said plunger drive pump and said power splitting drive; and a one-way clutch coupled between said power splitting drive and said flywheel for transferring power only in a direction from said power splitting drive to said flywheel.

18. The large rectangular baler drive arrangement defined in claim 17 wherein said power splitting drive includes a belt and pulley drive coupled for transferring rotation of said main drive shaft to said one-way clutch and to said auxiliary function drive shaft.

* * * * *